United States Patent [19]
Oetiker

[11] 3,870,349
[45] Mar. 11, 1975

[54] CONNECTING DEVICE BETWEEN A PIPE STUB AND A FLEXIBLE HOSE SURROUNDING THE STUB

[76] Inventor: Hans Oetiker, Oberdorfstrasse 21, 8810 Horgen, Switzerland

[22] Filed: Aug. 13, 1973

[21] Appl. No.: 387,640

[30] Foreign Application Priority Data
Aug. 14, 1972 Switzerland.................. 11993/72

[52] U.S. Cl. .............................................. 285/249
[51] Int. Cl. ............................................. F16l 33/00
[58] Field of Search. 285/249, 248, 382.7, 341–343, 285/54, 231, 232, 374, 377

[56] References Cited
UNITED STATES PATENTS

| | | | |
|---|---|---|---|
| 2,460,653 | 1/1949 | Raybould | 285/249 |
| 2,464,416 | 3/1949 | Raybould | 285/249 |
| 2,475,741 | 7/1949 | Goeller | 285/382.7 |
| 3,596,933 | 8/1971 | Luckenbill | 285/54 |
| 3,603,912 | 9/1971 | Kelly | 285/249 X |
| 3,685,860 | 8/1972 | Schmidt | 285/249 |
| 3,743,324 | 7/1973 | Misak et al. | 285/343 X |

FOREIGN PATENTS OR APPLICATIONS

| | | |
|---|---|---|
| 1,120,185 | 7/1956 | France |
| 1,546,769 | 10/1968 | France |
| 1,228,872 | 11/1966 | Germany |

*Primary Examiner*—Geo. V. Larkin
*Attorney, Agent, or Firm*—Craig & Antonelli

[57] ABSTRACT

A connection arrangement between a pipe stub and a hose surrounding the same which includes an axially symmetrical clamping member surrounding the hose and, axially on both sides thereof one sleeve-like clamping nut or collar with sections of hollow cylindrical shape which are directly adjacent one another; the two sleeve-like clamping nuts or collars can be tightened with each other so that the clamping member which consists of a deformable and simultaneously substantially non-compressible material, is pressed against the outer surface of the hose thereby establishing the connection; external grooves may be provided on the outer surface of the clamping member which extend approximately parallel to the axis.

17 Claims, 3 Drawing Figures

PATENTED MAR 11 1975 3,870,349

3,870,349

CONNECTING DEVICE BETWEEN A PIPE STUB AND A FLEXIBLE HOSE SURROUNDING THE STUB

The present invention relates to a connecting device between a pipe stub and a flexible tube or hose surrounding the stub, which comprises an axially symmetrical clamping member surrounding the flexible hose and two sleeve-like clamping nuts or collars axially arranged at each end of the clamping member which are axially interlockable and have axial, mutually adjacent portions of hollow cylindrical form.

Connecting devices of this type are known in the prior art in which the clamping member is provided with at least one conical flank which cooperates with a corresponding internal surface of a clamping collar, whereby the deformability of the clamping member is based on the fact that it is provided with slots extending across its entire wall thickness, i.e. extending through the entire wall thickness. Such deformation slots may be, for instance, helical or approximately axial whereby they extend from one end wall of the clamping member to approximately the axial center or, in case of only a single slot, also over the entire axial extent of the clamping member.

Such a type of construction entails the disadvantage of high production costs and in particular also involves the drawback that the flexible tube or hose material penetrates into the slots when the clamping nuts or collars are tightened, and/or that portions of an end of the clamping member located between two slots work or dig into the flexible hose material like claws, which may lead to a damage of the hose. Added thereto is the fact that an uninterrupted, continuous contact zone between the wall of the central bore of the clamping member and the hose does not come into existence, so that the hose also does not abut against the entire external surface of the pipe stub, which may impair a reliable sealing between the hose and the pipe stub.

Another known approach for sealing connecting devices is to use a clamping member in the form of a smooth cylindrical ring with conically bevelled ends. In this case, the clamping member does not press the hose to be held fast and sealed, against a circular cylindrical, external surface of uniform diameter, but instead presses it into a corresponding preformed recess of a form-rigid pipe. It is only this recess which enables at all the sealing of the hose. Also this type of construction is again unsatisfactory, notably because of certain assembly difficulties.

The present invention aims at avoiding these disadvantages. For this purpose, a connecting arrangement between a pipe stub and a flexible hose of the type described above is constructed according to the present invention in such a manner that the clamping member consists of a deformable, yet substantially noncompressible material, and that the outer surface of the clamping member is provided with external grooves extending approximately parallel to the axis. In this embodiment of the present invention, the clamping member is compressed in the axial direction when the clamping nuts or collars are tightened, and since the material of the clamping member is not, or only insignificantly compressible, the compressed material seeks to expand in the radial direction. However, since an expansion radially outwards is not possible, because the hollow axial portions of the clamping nuts or collars delimit radially outwardly, the space surrounding the clamping member, the material can only expand radially inwardly towards the hose. In this manner, the clamping member is pressed firmly and approximately evenly against the hose, and the latter against the pipe stub, thus ensuring a dependable connection between the hose and the pipe stub.

The action described ensures a dependable connection between the hose and the pipe stub, in such a manner that none of the parts pressing against the hose damage the same, whereby at the same time a continuous uninterrupted contact zone comes into existence between the hose and the pipe stub. Another advantage resides in that the manufacture of a clamping member from deformable material is considerably more inexpensive that that of a clamping member from metal with milled in slots.

In the embodiment described, it is immaterial whether the material of the clamping member is plastically or elastically deformable. Tests have shown that a clamping member of nylon produces particularly good results. Accordingly, a particularly appropriate type of construction of the present invention therefore essentially consists in that the clamping member consists of elastically deformable material, preferably of nylon.

As a rule, it is expedient or even necessary that the clamping member be made of a material harder than that of the flexible hose. One avoids thereby that the material of the clamping member during tightening of the clamping nuts or collars, flows through at the axial ends thereof between the hose and the end or ends of the clamping collar or collars surrounding the hose. According to a special feature of the present invention, the material of the clamping member is therefore harder than that of the hose.

In the light of the described measures, it is apparent that it is sufficient in many cases to use a clamping member whose outer surfaces, in the non-tightened condition, are continuously or uninterruptedly smooth, i.e., do not have any slots, channels or grooves, and such a clamping member is also exceptionally inexpensive to manufacture. According to one embodiment of the present invention, the clamping member presents therefore continuously smooth surfaces.

However, it is not decisive for the purposes of the present invention whether or not the clamping member presents continuouly smooth surfaces. Insofar as any slots or grooves are provided, especially on the internal surface of the clamping member, the edges adjacent to such slots or grooves will work into the hose material only very gently and protectively, owing to the deformability of the material of the clamping member, whereby also the edges and the zones of the material of the clamping member adjacent thereto will be readily deformed slightly, so that a continuous contact between the hose and the pipe stub will in most cases be approximately preserved. Tests have shown that it is especially advantageous to provide the outer surface of the clamping member with grooves which extend approximately in the axial direction. Such grooves greatly increase the deformability of the clamping member and also have the effect that, when the sleeve-like clamping nuts or collars are tightened, bulges extending radially inwards are formed on the internal surface of the clamping member at the corresponding points of the circumferential division thereof; such bulge-like webs are well rounded-off and penetrate into the hose material without impairing it in any way. Accordingly, a particularly favorable type of construction resides in that the radial external surface of the clamping member is provided with grooves which extend approximately in the direction of the generatrices of the clamping member, i.e., in the axial direction thereof.

Furthermore, it is also inconsequential for the present invention which shape the clamping member has. Tests have shown that a clamping body which, apart from the central bore, has the form of a hollow truncated cone, gives exceptionally good results. Accordingly, in one special embodiment, the clamping member has the form of a hollow truncated cone, apart from a central bore.

Further tests have shown that, apart from the central bore, a clamping member is especially advantageous if it includes a central, axial cylindrical portion and, at both ends thereof, portions which have the form of a truncated cone whose wider ends face each other. Accordingly, one special feature of the present invention resides in that the hollow body, apart from a central bore, has a central axial cylindrical portion and, at both ends thereof, portions which have the form of a truncated cone and whose wider ends face each other.

It is readily possible to give the pipe stub a smooth surface because the radial pressure of the flexible hose on the pipe stub is generally sufficient to be able to resist the axial forces arising between the hose and the pipe stub. In many cases, it will be advantageous nonetheless to improve the adherence of the hose on the pipe stub by providing the external surface of the pipe stub in the axial area of the hose with circumferential grooves of round or saw-tooth-shaped profile or with individual protuberances or beads. According to a special feature of the present invention, the external surface of the pipe stub is therefore provided, in the axial area of the hose, as viewed in the axial direction, with at least one bulge or neck extending along at least part of the circumference.

When the sleeve-like clamping nuts or collars are sufficiently tightly interengaged, the force of the clamping member acting in the radial direction towards the axis of the pipe stub is in many cases sufficient to be able to resist the axial forces arising between the hose and the pipe stub. In many cases, however, it will be expedient for one of the clamping nuts or collars to be axially fixed with respect to the pipe stub. In practice, it will invariably be advantageous if the sleeve-like clamping nut or collar farther away from the mouth of the pipe stub is made integral with the pipe stub or screwed onto the latter. According to another special feature of this invention, one of the clamping collars is axially fixed with respect to the pipe stub. As a result thereof, the axial forces occurring between the hose and the pipe stub are resisted not only by the mutual adherence of the described components on each other, but are also absorbed by one of the clamping collars by way of the clamping member.

Accordingly, it is an object of the present invention to provide a connecting arrangement between a pipe stub and a hose surrounding the same which avoids by simple means the aforementioned shortcomings and drawbacks encountered in the prior art.

Another object of the present invention resides in a connecting arrangement between a pipe stub and a hose surrounding the same which excels by particularly low manufacturing costs, yet is completely reliable in operation.

A further object of the present invention resides in a connecting device between a pipe stub and a flexible hose surrounding the same which assures a reliable seal, evan at relatively elevated pressures, yet does not lead to damage of the hose material when tightening the hose onto the pipe stub.

Still a further object of the present invention resides in a connecting arrangement of the type described above which not only assures a reliable seal between the hose and the pipe stub but additionally excels by ease of assembly.

Another object of the present invention resides in a connecting arrangement between a pipe stub and a hose surrounding the same which results in pressing the clamping member firmly and approximately uniformly onto the hose, whence a reliable connection between the hose and the pipe stub is established.

These and other objects, features and advantages of the present invention will become more apparent from the following description when taken in connection with the accompanying drawing which shows, for purposes of illustration only, one embodiment in accordance with the present invention. and wherein.

Figure 1:
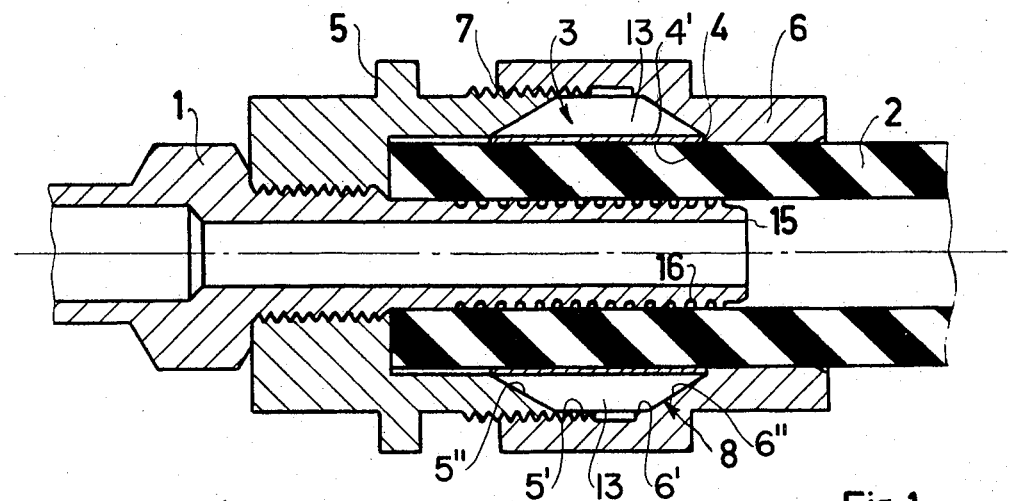
FIG. 1 is an axial sectional view through a connecting arrangement between a flexible hose and a pipe stub in accordance with the present invention.

Referring now to the drawing wherein like reference numerals are used throughout the various views to designate like parts, and more particularly to FIG. 1, a pipe stub 1, for example, in the form of a nipple, is designated in this figure by reference numeral 1 and a tube or hose surrounding the pipe stub 1 by reference numeral 2. The hose 2 is surrounded by an axially symmetrical clamping member generally designated by reference numeral 3 which is provided with an internal surface forming a central bore 4 for this purpose. Arranged axially at both ends of the clamping member 3 are sleeve-like clamping nuts or collars 5, 6 which are screwed together at 7 and are thus adapted to be axially tightened to each other, whereby the arrangement is such that the hollow-cylindrical, axial portions 5' and 6' of the clamping nuts or collars 5 and 6 are directly adjacent to each other.

The clamping member 3 consists of deformable, yet substantially non-compressible material, in particular of nylon, and the annular space generally designated by reference numeral 8 which is axially and radially outwardly delimited by the conical portions 5'', 6'' and the axial portions 5', 6' of the clamping nuts or collars 5, 6 and which is radially inwardly delimited by the hose 2, is substantially filled out by the clamping member 3 in the non-tightened condition of the clamping member 3 and of the hose 2.

Apart from its central bore 4 formed by the cylindrical wall portion 4', the clamping member 3 includes outwardly of the wall portion 4' a central axial cylindrical portion 9 (FIG. 3) and, on both sides thereof, portions 10 which have the form of a truncated cone whose wider ends 11 face each other.

Figure 2:
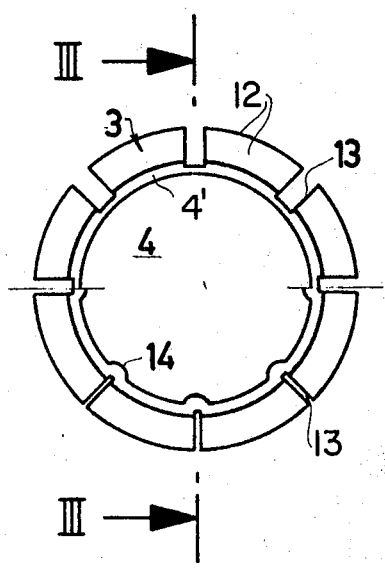
FIG. 2 is an axial view of the clamping member of the arrangement according to FIG. 1 showing in the upper half the configuration of the clamping member prior to use and in the lower half the configuration of the clamping member after use in the connecting arrangement according to the present invention.

The radial external surface 12 of the clamping member 3, which extends over the axial portions 10, 9, 10 thereof, is provided with a total of eight grooves 13 extending in the direction of generatrices of the clamping member 3, i.e., in the axial direction thereof. The upper half of FIG. 2 shows the clamping member 3 before the tightening of the clamping nuts or collars 5, 6, and the lower half shows it after the tightening thereof. It will be seen from the lower half of FIG. 2 that during the tightening operation, radially inwardly pointing bulges 14 are formed on the internal surface of the clamping member 3 in the wall portions 4' thereof at the corresponding points of the circumferential division where the slots 13 were reduced in width due to the compressing action resulting from the tightening of the clamping nuts 5 and 6; however, these bulges 14 do not disappear after the untightening of the clamping nuts or collars 5, 6. The bulges 14 have rounded-off profiles and therefore do not damage the hose material in any way. The grooves 13 are practically closed when the sleeve-like clamping nuts or collars 5 and 6 are tightened to the desired degree.

Owing to the continuous, non-slotted internal surface of the clamping member 3, the hose 2 cannot be squeezed into any slots during the tightening operation. Under the radial forces produced as a result of the cones 10, the hose 2 will tend to alter its diameter inwardly, without any possibility for the rubber to shear out or escape into slots. In contradistinction thereto, in the case of ordinary, slotted clamping sleeves, the rubber can enter into the slots thereof which far-reachingly jeopardizes the diameter reduction thereof and therewith impairs the contact pressure and thus an abutment of the hose in the radial direction. Additionally, when the prior art connecting device is firmly tightened, the external surface of the hose suffers damage from the ever-increasing clamping effect of the narrowing slots of the clamping sleeve. All these disadvantages are avoided by the arrangement according to the present invention.

The sleeve-like clamping nut or collar 5 farther removed from the mouth 15 of the pipe stub 1 is screwed onto the pipe stub 1 and is therefore axially fixed with respect to the latter. The pipe stub 1, for example, a nipple, is provided with circumferential grooves 16 in the axial area of the flexible hose 1.

Figure 3:
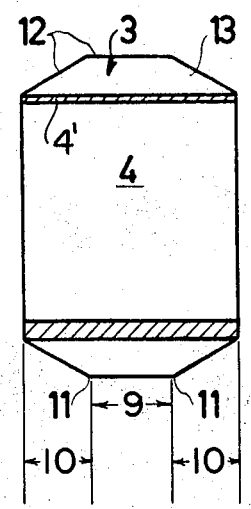
FIG. 3 is a cross sectional view taken along line III—III in FIG. 2.

The clamping member 3 in FIGS. 1 and 3, and the hose 2 in FIG. 1 are shown in the released, i.e., untightened condition. When the sleeve-like clamping nuts or collars 5, 6 are mutually tightened, the clamping member 3 is reduced in its axial dimension since the space 8 is also reduced in its axial dimension, whence the clamping member 3 will be forced in the radially inward direction, as already mentioned above, due to the fact that it cannot expand in the radially outward direction owing to the presence of the solid clamping collars or nuts 5 and 6 so that the grooves 13 will close, as shown in the lower half of FIG. 2, due to this radially inward displacement of the clamping member, and the ridges formed by the grooves 16 of the nipple 1 will work into and penetrate into the hose 2 which is now similarly displaced radially inwardly by the compressing action exerted thereon by the clamping member 3.

However, instead of consisting of nylon, the clamping body may also consist of synthetic hard rubber, natural rubber, plastic or pressed material, lead or some non-ferrous alloy.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A connecting device between a pipe stub and a flexible hose surrounding said stub, comprising a substantially axially symmetrical clamping means surrounding said hose and two clamping collar means which are arranged axially at each end of said clamping means and which are adapted to be axially tightened with each other, said clamping collar means having axial portions of substantially hollow cylindrical form which face one another, characterized in that the clamping means consists of a deformable, yet substantially non-compressible material, and in that the outer surface of the clamping means is provided with groove means that extend at least approximately parallel to the axis and have a depth smaller than the radial thickness of the clamping means within the areas thereof devoid of groove means so that a continuous internal surface is provided by the clamping means which is uninterrupted.

2. A connecting device according to claim 1, characterized in that the material of the clamping means is harder than the material of the flexible hose.

3. A connecting device according to claim 2, characterized in that the material of the clamping means is selected from the group consisting of nylon, synthetic hard rubber, natural rubber, plastic or pressed material, lead and non-ferrous alloys.

4. A connecting device according to claim 2, characterized in that the internal surface of the clamping means, in the non-tightened condition, is continuously smooth.

5. A connecting device according to claim 4, characterized in that the remaining radial material thickness of the clamping means within the area of the groove means is smaller than the material thickness in the area of the remaining portions thereof by such an extent that, in the tightened condition of the clamping means, inwardly protruding bulges are formed in the area of the groove means, which prevent damage to the hose.

6. A connecting device according to claim 5, characterized in that said clamping means essentially consists of nylon.

7. A connecting device according to claim 1, characterized in that the internal surface of the clamping means formed by alternating portions of the clamping means devoid of and provided with groove means, is continuously smooth in the non-tightened condition.

8. A connecting device according to claim 7, characterized in that the remaining radial material thickness of the clamping means within the area of the groove means is smaller than the material thickness in the area of the remaining portions thereof by such an extent that, in the tightened condition of the clamping means, inwardly protruding bulges are formed in the area of the groove means, which prevent damage to the hose.

9. A connecting device according to claim 1, characterized in that said clamping means essentially consists of nylon.

10. A connecting device between a pipe stub and a flexible hose surrounding said stub, comprising a substantially axially symmetrical clamping means surrounding said hose and two clamping collar means which are arranged axially at each end of said clamping means and which are adapted to be axially tightened with each other, said clamping collare means having axial portions of substantially hollow cylindrical form which face one another, characterized in that the clamping means consists of a deformable, yet substantially non-compressible material, and in that the clamping means is provided with groove means extending in a direction approximately parallel to the axis from the outer surface thereof inwardly to a point spaced from the inner surface thereof so that the portions devoid of groove means are connected with each other along the inner surface by the remaining portions left by the groove means.

11. A connecting device according to claim 10, characterized in that the internal surface of the clamping means, in the non-tightened condition, is continuously smooth.

12. A connecting device according to claim 10, characterized in that the material of the clamping means is harder than the material of the flexible hose.

13. A connecting device according to claim 12, characterized in that the material of the clamping means is selected from the group consisting of nylon, synthetic hard rubber, natural rubber, plastic or pressed material, lead and non-ferrous alloys.

14. A connecting device according to claim 10, characterized in that the radial material thickness of the remaining portions of the clamping means within the area of the groove means is so much smaller than the minimum material thickness in the area of the remaining portions of the clamping means that, in the tightened condition of the clamping means, inwardly protruding bulges are formed by the remaining portions within the area of the groove means, which prevent damage to the hose.

15. A connecting device according to claim 10, characterized in that said clamping means essentially consists of nylon.

16. A connecting device according to claim 10, wherein said stub is provided with circumferential grooves so that the ridges left by the grooves will work themselves into the material of the flexible hose upon compressing of the clamping means.

17. A connecting device according to claim 1, wherein said stub is provided with circumferential grooves so that the ridges left by the grooves will work themselves into the material of the flexible hose upon compressing of the clamping means.

* * * * *